United States Patent
Hammonds et al.

(10) Patent No.: US 10,163,293 B2
(45) Date of Patent: Dec. 25, 2018

(54) NETWORKED VENDOR FOR WORKPLACE OR CONTROLLED ENVIRONMENT

(71) Applicant: PepsiCo, Inc., Purchase, NY (US)

(72) Inventors: Marcus Hammonds, New Rochelle, NY (US); Marco Perry, Brooklyn, NY (US)

(73) Assignee: PepsiCo, Inc., Purchase, NY (US)

( * ) Notice: Subject to any disclaimer, the term of this patent is extended or adjusted under 35 U.S.C. 154(b) by 0 days.

(21) Appl. No.: 15/197,480

(22) Filed: Jun. 29, 2016

(65) Prior Publication Data

US 2016/0307391 A1    Oct. 20, 2016

Related U.S. Application Data

(62) Division of application No. 13/153,107, filed on Jun. 3, 2011, now Pat. No. 9,406,187.

(60) Provisional application No. 61/351,611, filed on Jun. 4, 2010.

(51) Int. Cl.
*G07F 11/38* (2006.01)
*G06Q 20/20* (2012.01)
*H04L 29/08* (2006.01)

(52) U.S. Cl.
CPC ............ *G07F 11/38* (2013.01); *G06Q 20/203* (2013.01); *H04L 67/10* (2013.01)

(58) Field of Classification Search
CPC ............................... G07F 11/38; G06Q 20/203
USPC ................................................. 700/231–244
See application file for complete search history.

(56) References Cited

U.S. PATENT DOCUMENTS

| | | |
|---|---|---|
| 3,716,697 A | 2/1973 | Weir |
| 3,884,386 A | 5/1975 | Urcola |
| 4,108,363 A | 8/1978 | Susumu |
| 4,419,734 A | 12/1983 | Wolfson et al. |
| 4,812,985 A | 3/1989 | Hambrick et al. |
| 4,866,661 A | 9/1989 | de Prins |
| 5,252,948 A | 10/1993 | Goris et al. |

(Continued)

FOREIGN PATENT DOCUMENTS

| | | |
|---|---|---|
| CA | 2333395 A1 | 12/1999 |
| FR | 2 317 712 A1 | 2/1977 |

(Continued)

OTHER PUBLICATIONS

Newmarch, J. Schulz, K., et al., Using the Web and Jini to Link Vending Machines and Enterprise Systems, Technology of Object-Oriented Languages and Systems, 2000, TOOLS—Asia 2000 Proceedings 36$^{th}$ International Conference in Xi'an, publication date 2000.

(Continued)

*Primary Examiner* — Michael Collins
(74) *Attorney, Agent, or Firm* — Sterne, Kessler, Goldstein & Fox P.L.L.C.

(57) ABSTRACT

Aspects of the invention described herein provide an apparatus and method for networked vending. According to embodiments described herein, a vending machine is provided that may be installed and managed by the venue in which it is installed. Consumers may purchase vending products from the vending machine using cashless accounts managed by an external device in communication with the vendor. The venue may manage the inventory for the vending machine by placing orders for single product inserts to be loaded in the vending machine.

22 Claims, 7 Drawing Sheets

(56) References Cited

U.S. PATENT DOCUMENTS

| | | | |
|---|---|---|---|
| 5,407,050 A | | 4/1995 | Takemoto et al. |
| 5,671,362 A | | 9/1997 | Cowe et al. |
| 5,706,976 A | | 1/1998 | Purkey |
| 5,728,999 A | * | 3/1998 | Teicher .................. G06Q 20/04 |
| | | | 235/380 |
| 5,822,216 A | | 10/1998 | Satchell, Jr. et al. |
| 5,959,869 A | | 9/1999 | Miller et al. |
| 6,195,005 B1 | | 2/2001 | Maloney |
| 6,317,044 B1 | | 11/2001 | Maloney |
| 6,359,281 B1 | | 3/2002 | Pawlak et al. |
| 6,499,359 B1 | | 12/2002 | Washeleski et al. |
| 6,539,281 B2 | * | 3/2003 | Wan ........................ G07F 9/026 |
| | | | 700/236 |
| 6,601,763 B1 | | 8/2003 | Hoch et al. |
| 6,659,341 B1 | | 12/2003 | Wang |
| 6,694,221 B2 | | 2/2004 | Chavez et al. |
| 6,695,166 B2 | | 2/2004 | Long |
| 6,707,381 B1 | * | 3/2004 | Maloney ............ G07C 9/00103 |
| | | | 340/568.1 |
| 6,712,266 B2 | | 3/2004 | Bartley et al. |
| 6,907,741 B2 | | 6/2005 | Kateman |
| 6,980,887 B2 | | 12/2005 | Varga et al. |
| 6,993,501 B1 | | 1/2006 | Zhao |
| 7,051,212 B2 | | 5/2006 | Ginter et al. |
| 7,092,789 B2 | | 8/2006 | Chavez et al. |
| 7,195,157 B2 | | 3/2007 | Swartz et al. |
| 7,233,241 B2 | | 6/2007 | Overhultz et al. |
| 7,249,050 B1 | | 7/2007 | Walker et al. |
| 7,328,190 B2 | | 2/2008 | Smith et al. |
| 7,347,368 B1 | | 3/2008 | Gravelle et al. |
| 7,451,892 B2 | | 11/2008 | Walker et al. |
| 7,469,820 B2 | | 12/2008 | Rosenblum |
| 7,535,337 B2 | | 5/2009 | Overhultz et al. |
| 7,584,016 B2 | | 9/2009 | Weaver |
| 7,650,298 B2 | | 1/2010 | Godlewski |
| 7,937,289 B2 | | 5/2011 | Bodin et al. |
| 8,025,225 B2 | | 9/2011 | Mochizuki et al. |
| 8,175,746 B2 | | 5/2012 | Godlewski |
| 8,468,059 B2 | * | 6/2013 | Enqvist ................ G06Q 20/201 |
| | | | 177/4 |
| 9,406,187 B2 | * | 8/2016 | Hammonds .......... G06Q 20/203 |
| 2003/0078693 A1 | | 4/2003 | Chavez et al. |
| 2004/0232227 A1 | | 11/2004 | Kusakawa |
| 2005/0053650 A1 | * | 3/2005 | Chalmers .................. A61J 7/00 |
| | | | 424/451 |
| 2005/0139649 A1 | | 6/2005 | Metcalf et al. |
| 2005/0190072 A1 | | 9/2005 | Brown et al. |
| 2005/0209879 A1 | * | 9/2005 | Chalmers ............... G06Q 50/22 |
| | | | 705/2 |
| 2006/0242075 A1 | | 10/2006 | Ginter et al. |
| 2006/0276933 A1 | | 12/2006 | Chaves et al. |
| 2007/0162184 A1 | * | 7/2007 | Pinney ................ G06F 19/3462 |
| | | | 700/241 |
| 2007/0215433 A1 | | 9/2007 | Logan et al. |
| 2008/0099496 A1 | | 5/2008 | Black et al. |
| 2008/0164975 A1 | | 7/2008 | Butler et al. |
| 2009/0051486 A1 | | 2/2009 | Denison et al. |
| 2009/0057394 A1 | | 3/2009 | DeGironemo |
| 2009/0094127 A1 | * | 4/2009 | Enqvist ................ G06Q 20/201 |
| | | | 705/20 |
| 2009/0114041 A1 | | 5/2009 | Harish et al. |
| 2009/0177315 A1 | * | 7/2009 | Goeking ................ A47K 10/34 |
| | | | 700/231 |
| 2009/0222359 A1 | | 9/2009 | Henry |
| 2010/0070075 A1 | | 3/2010 | Chirnomas |
| 2010/0138037 A1 | | 6/2010 | Adelburg |
| 2010/0327001 A1 | | 12/2010 | Godlewski |
| 2011/0238209 A1 | | 9/2011 | Roekens et al. |
| 2011/0301749 A1 | * | 12/2011 | Hammonds ............. G07F 11/38 |
| | | | 700/232 |

FOREIGN PATENT DOCUMENTS

| | | |
|---|---|---|
| JP | 5-235698 A | 3/1977 |
| JP | 11-506557 A | 6/1999 |
| JP | 2004-145471 A | 5/2004 |
| JP | 2006-107296 A | 4/2006 |
| WO | WO 03/040914 A2 | 5/2003 |
| WO | WO 2007/128572 A1 | 11/2007 |
| WO | WO 2009/100123 | 8/2009 |

OTHER PUBLICATIONS

Robert W. Baldwin & C. Victor Chang, Locking the e-safe, IEEE Spectrum, vol. 34, Issue 2, pp. 40-46, publication date Feb. 1997.

Eric K. Clemons, David C. Croson, et al., Reengineering Money: The Mondex Stored Value Card and Beyond—System Sciences, Proceedings of the 29th Annual Hawaii International Conference on System Sciences—1996, publication date Jan. 1996.

Roger W. Webster, Ph.D., Paul W. Ross, et al. Controlling A Java Enabled Pepsi Vending Machine Over the World Wide Web, Industrial Electronics Society, 1999, IECON '99 Proceedings, The 25th Annual Conference of the IEEE, vol. 1, pp. 86-90, publication date Nov. 29-Dec. 3, 1999.

Ross Anderson, Mike Bond, Jolyon Clulow, Sergei Skorobogatov, Cryptographic Processors—A Survey, Proceedings of the IEEE, vol. 94, No. 2, publication date Feb. 2006.

Springwise, Ice cream factory in a vending machine, Food & Beverage—Springwise.com, publication date May 5, 2006.

Jeanne Bock, Moobella and Fluid Management, Inc. Announce Engineering and Manufacturing Agreement—Press Release, Moobella Corporation, publication date Sep. 4, 2007.

PCT/US2011/039111 International Search Report dated Oct. 10, 2011.

AU Application No. 2011261300 Examination Report dated Oct. 10, 2013.

First Examination Report issued in Indian Patent Application No. 10152/CHENP/2012, dated Mar. 28, 2018, 5 pages.

* cited by examiner

NETWORKED VENDOR FOR WORKPLACE OR CONTROLLED ENVIRONMENT

CROSS-REFERENCE TO RELATED APPLICATIONS

This application is a divisional of U.S. application Ser. No. 13/153,107, filed Jun. 3, 2011, which claims the benefit of U.S. Provisional Application No. 61/351,611, filed on Jun. 4, 2010. Both of these prior filed applications are incorporated herein by reference in their entirety.

FIELD OF THE INVENTION

The invention relates to networked vending machines. In particular, the invention relates to vending machines that may be operated in a controlled, networked environment wherein consumer accounts, purchases, and refills of the vendor may be managed at the venue via a network.

BACKGROUND

Vending machines have been used to sell perishable and non-perishable food and beverage items, as well as various other sundries, for many years. Typically, the vendor is placed at a point of sale location by a distributor or bottler and the inventory for the vendor is managed by the distributor or bottler according to a regular schedule. When a consumer makes a purchase from such a vending machine, the consumer typically deposits a cash value for the good(s) being purchased at the time of purchase.

However, in the typical management scenario described above, the point of sale location, such as an office, a school, or a store, oftentimes has no input into the types and quantities of product that are placed in the machine. Furthermore, because the distributor or bottler has no way to monitor the inventory of the vendor, the manufacturer or bottler must stock the vendor according to regularly scheduled visits, regardless of whether a restocking is necessary.

There is a need in the art for a managed vending machine, wherein the inventory of the vendor may be managed at the point of sale location and tailored to the consumer base. Further, there is a need in the art for a vending machine that supports a non-cash vending option.

SUMMARY

The following presents a general summary of some aspects of the invention. The summary is intended to provide a general overview and is not intended to apprise of the full scope of the invention.

Aspects of the invention described herein relate to vending machines that may be operated in a networked environment. According to at least one embodiment, a vending machine/vendor may be provided by a distributer, manufacturer or bottler, wherein vending products within the vending machine may be accessed and purchased by consumers using cashless, networked accounts.

Consumer accounts for the vendor may be managed by an external managing device (and associated software), in communication with a vendor computing device. Consumers may access personal accounts via an online network, e.g. an intranet, to add credit to a personal account. In alternative embodiments, the management software may deduct a balance from a payroll or student account, or use any other suitable form of payment deduction. Once a personal account is established, a consumer may access and purchase products from the networked vendor. The consumer may gain access to the vendor using an RFID tag, a keypad, or other suitable means known to those of skill in the art.

The inventory for the vendor may be contained in single product inserts that may be loaded and unloaded by the managing venue, as needed. Once loaded, the vendor may recognize the type and quantity of vending product in each insert by reading identification data displayed on the insert(s), and use such identification data when making inventory determinations. The vendor may also recognize, by use of weight sensors distributed in the vendor, a weight for each insert, and may use the weight data to determine the type of vending product that has been purchased by a consumer.

A more detailed summary of the invention and exemplary embodiments can be found in the detailed description of the invention.

BRIEF DESCRIPTION OF THE DRAWINGS

The present invention is illustrated by way of example in the following figures and is not limited by the accompanying figures in which.

DETAILED DESCRIPTION

In the following description of various example embodiments of the invention, reference is made to the accompanying drawings, which form a part hereof, and in which are shown by way of illustration various example devices, systems, and environments in which aspects of the invention may be practiced. It is to be understood that other specific arrangements of parts, example devices, systems, and environments may be utilized and structural and functional modifications may be made without departing from the scope of the present invention.

Figure 1:
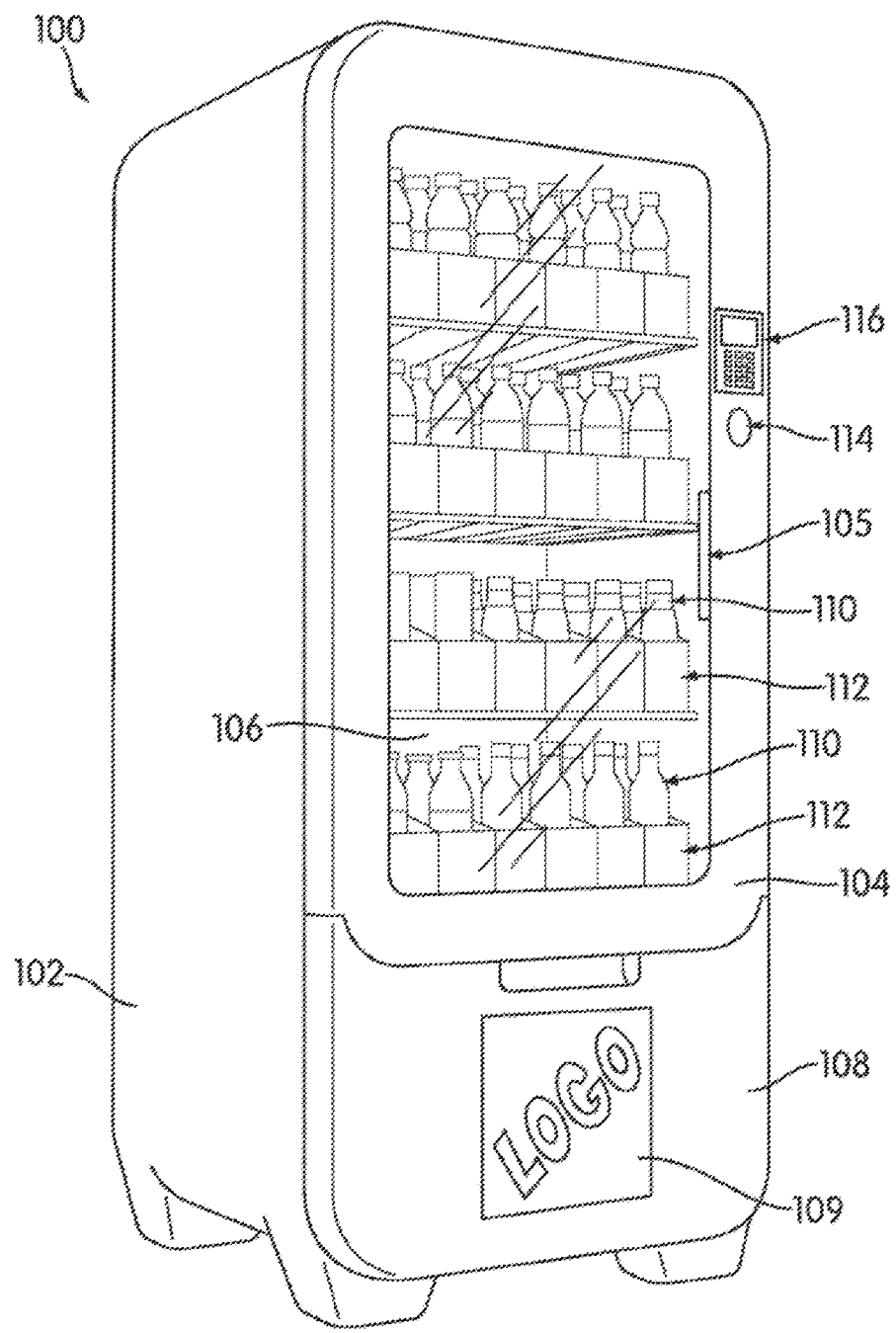
FIG. 1 depicts an exemplary networked vending machine according to an embodiment of the present invention.

Aspects of the invention described herein provide a networked vending machine for use in an office or other controlled environment, such as a school. FIG. 1 depicts an exemplary networked vendor 100 according to an embodiment of the present invention. Vendor 100 comprises external cabinet 102 that encloses and defines an interior area (as labeled 200 in FIG. 2). Cabinet 102 may be made from a plurality of pieces (such as side panels, a rear panel, a front panel, a top panel or a bottom panel) or may be structured by any method known in the art without departing from the invention. Vending products 110, stored within vendor 100, may be accessed by a hinged door 104 with handle 105. Door 104 may have a glass or plastic viewing front surface 106 for viewing vending products 110 contained within vendor 100. According to aspects of the invention, vendor 100 may have a plurality of racks or shelves (as labeled 202 in FIG. 2) for holding a plurality of vending inserts 112. Vending inserts 112 may be fashioned to hold vending products 110 and may be shaped in a variety of manners to conform to the size and shape of the cabinet interior. For example, vendor cabinet 102 may be sized smaller for use in an environment with a limited number of consumers, such as a small office, or larger for use in an environment with many consumers, such as a university campus. Vending inserts 112 may be sized smaller for a small vendor cabinet and larger for a large cabinet. Cabinet 102 may also include other features such as drawer 108 with logo area 109.

Vendor 100 may have a consumer input device 114 and display 116 disposed on the exterior of cabinet 102. Input device 114 and display 116 may also be disposed on the vending door 106 or other area as appropriate, and as contemplated by one of skill in the art. Consumer input device 114 may comprise a sensor, configured to read an electronic input signal, such as from an RFID tag. Consumer input device may also comprise a keypad, wherein a consumer may key in an ID code or other identifier to identify a consumer's account and gain access to the vending machine 100. Exemplary input device 114 and display 116 are coupled to a vending computing device (as labeled 212 in FIG. 2, and described further below) comprising a processor, for further operation of the device.

As described, FIG. 1 depicts an exemplary embodiment of a vending machine 100 according to aspects described herein. Those skilled in the art will recognize that vendor 100, and specifically, cabinet 102, may be formed according to techniques known in the art without departing from the present invention. Furthermore, it should be understood that many of the components of vendor 100 identified in FIG. 1 may be varied in size, shape and location without departing from the techniques described herein.

Figure 2:
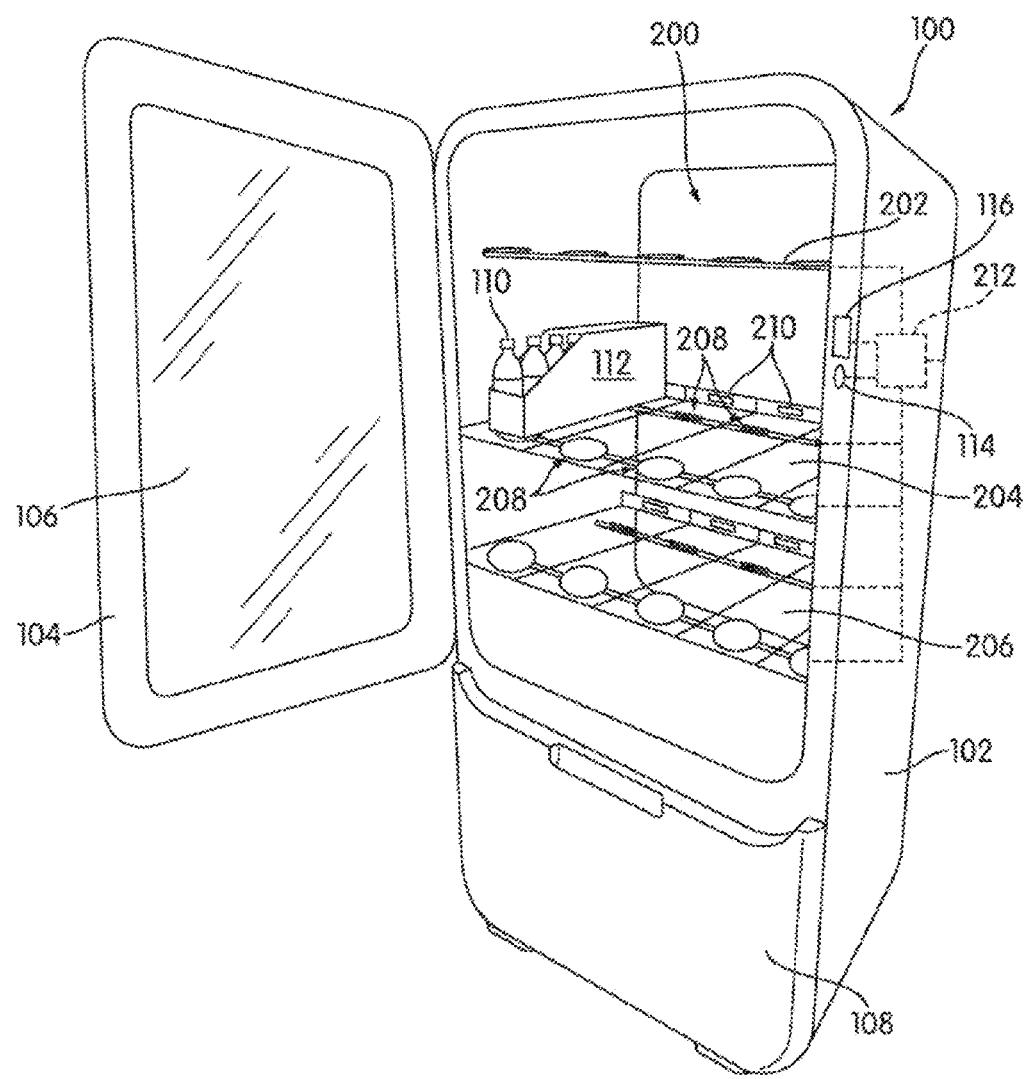
FIG. 2 depicts an exploded view of the interior of the exemplary networked vending machine of FIG. 1, according to an embodiment of the present invention.

FIG. 2 depicts an exploded view of certain components of the interior 200 of the exemplary networked vending machine 100 of FIG. 1, according to an embodiment of the present invention. As seen in FIG. 2, vending insert 112 (note that reference numbers are carried over in each Figure) rests on a shelf or rack, 204. FIG. 2 depicts three racks 202, 204, 206, however, in practice, a vendor 100 may have more or fewer racks depending on the size of the vendor cabinet 102. Racks 202, 204, 206 are depicted as solid surfaces in FIG. 2, however the racks or shelves may be embodied in a variety of ways suitable for holding inserts 112. As labeled on exemplary rack 204, each of racks 202, 204, 206 include a plurality of weight sensors 208, at least one for each insert 112. Weight sensors 208 may be configured to determine an exact weight of the insert 112 (with vending products 110 included) and to communicate the weight data to a vending computing device 212. The racks 202, 204 and 206 may further include sensors 210, configured to read identification data contained on insert 112 and to communicate the identification data to vendor computing device 212. The weight sensors 208 may include any device suitable for the purpose of determining an accurate weight measurement and communicating the measurement to computing device 212. Similarly, sensors 210 may include any device suitable for the purposes of reading electronic data (such as data on a conductive ink label). Persons of ordinary skill will readily appreciate additional devices that may be used for the purpose of determining the weight of insert(s) 112, or for reading electronic data, as described above, and for communicating such data electronically to computing device 212. Those skilled in the art will also recognize that the components described herein may be arranged in a variety of manners, for example, sensors 210 may be located on any interior surface of cabinet 102.

Figure 3:
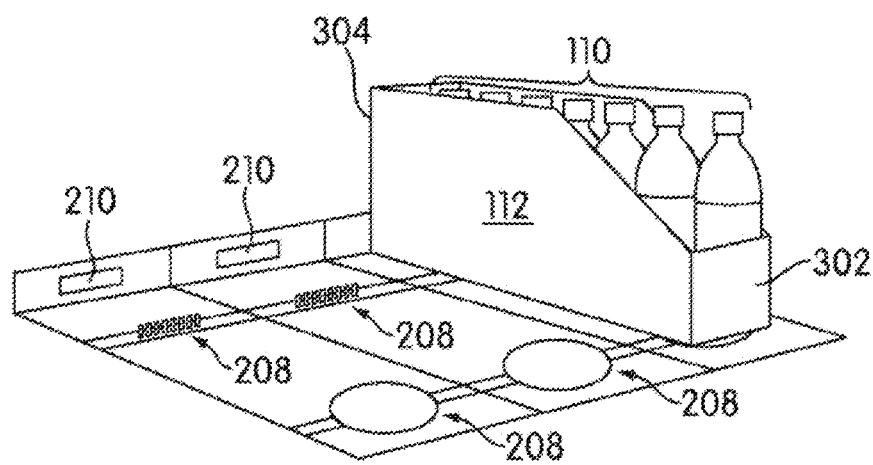
FIG. 3 depicts a view of certain interior components according to an embodiment of the present invention.
Figure 4:
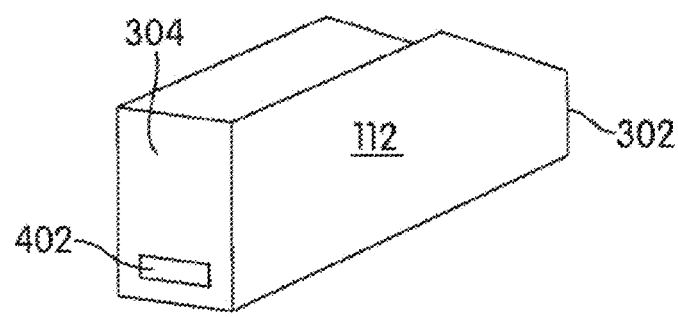
FIG. 4 depicts a rear view of a vending insert according to an embodiment of the invention.

FIG. 3 depicts a front view of a rack (or shelf) 202 with insert 112 according to an exemplary embodiment described herein. Insert 112 may have a front end 302, wherein the vending product 110 may be viewed through the viewing area 106 of the vending machine 100, and may also have a rear end 304. As previously described, rack 202 may include weight sensors 208 for determining a weight of insert 112 and for communicating a determined weight to computing device 212. Rack 202 may also include sensors 210. FIG. 4 depicts a back view of an exemplary insert 112 that may be used for practicing the invention described herein. As can be seen in FIG. 4, rear end 304 of insert 112 may comprise electronic data 402 for communicating identification data about the insert 112 and the specific vending product 110 contained therein. According to one embodiment of the invention, the electronic data 402 may be contained on a conductive ink label that is configured to be read by electronic data sensors 210 and communicated to computing device 212. The data may contain information such as the type of vending product in the insert, the amount of vending product in the insert, the stock weight of the insert, a relevant date of the insert and other pertinent information that may be used by vending machine 100 as described below. The invention is not confined to the methods and systems for communicating electronic data as described, and it is contemplated that other suitable methods of communicating such data that are known in the art may be employed with successful results, such as the use of a bar code and bar code reader.

Figure 5:
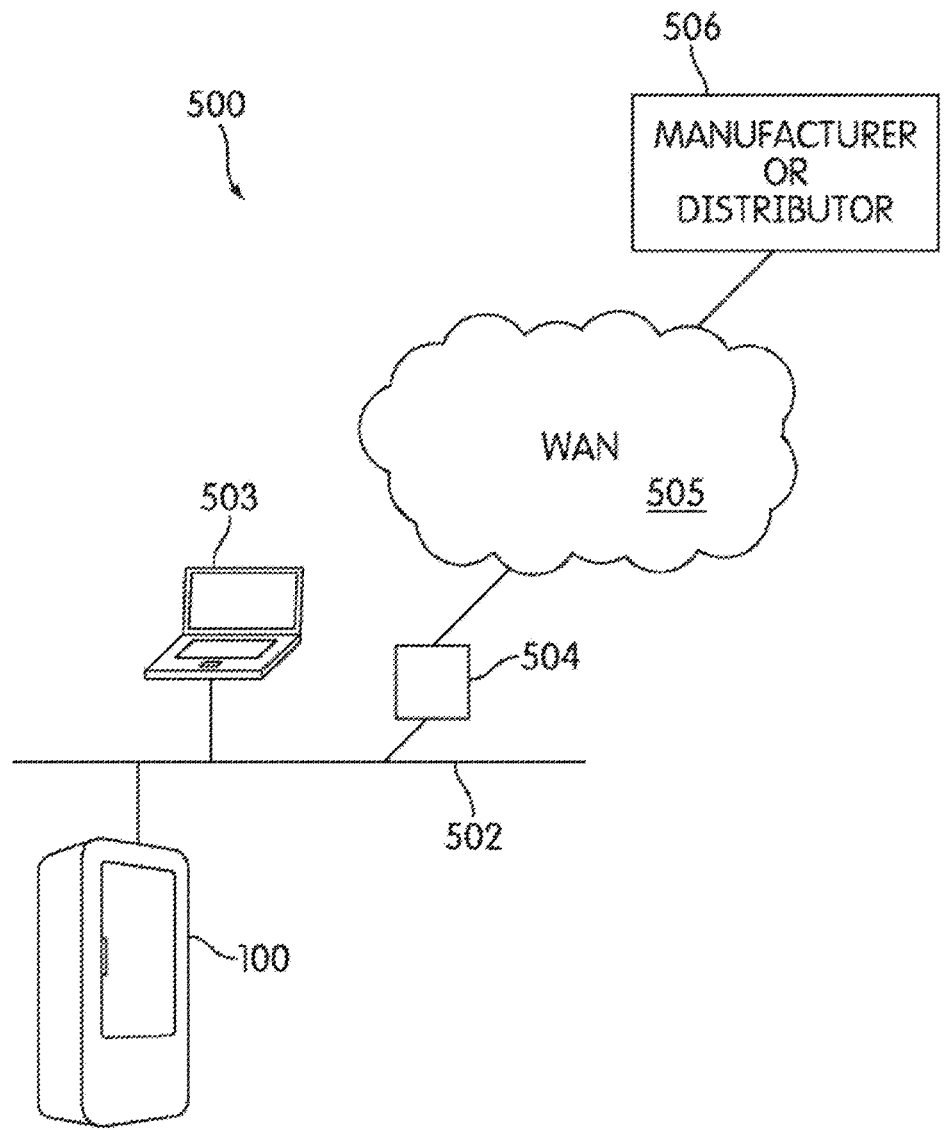
FIG. 5 depicts an exemplary network environment suitable for use and interconnection of exemplary components described herein, according to an embodiment of the present invention.

FIG. 5 depicts an exemplary network environment suitable for use in implementing aspects described herein and in interconnection of exemplary components described herein. As depicted, vending machine 100 is connected to network 502 via the internal or external computing device 212, further described below with respect to exemplary network device 600. Network 502 may be implemented according to any suitable networking environment known in the art such as a wired or wireless environment. In an exemplary embodiment, network 502 may be an Ethernet network. Managing device 503 may also be coupled to network 502 and configured to communicate with computing device 212 of vendor 100. Managing device 503 may be configured to manage consumer accounts, vending machine inventory, as well as to process orders. Network 502 may also be connected to a wide area network (WAN) 505, such as the public Internet or a private intranet via network access device 504. Network access device 504 may be any suitable access device for connecting over a broadband or wireless network such as a router, a wireless router, a modem or other suitable means. According to techniques described herein, managing device 503 may be further configured to communicate via WAN 505 with a manufacturer or bottling distributor 506, to order inventory for vendor 100.

Figure 6:
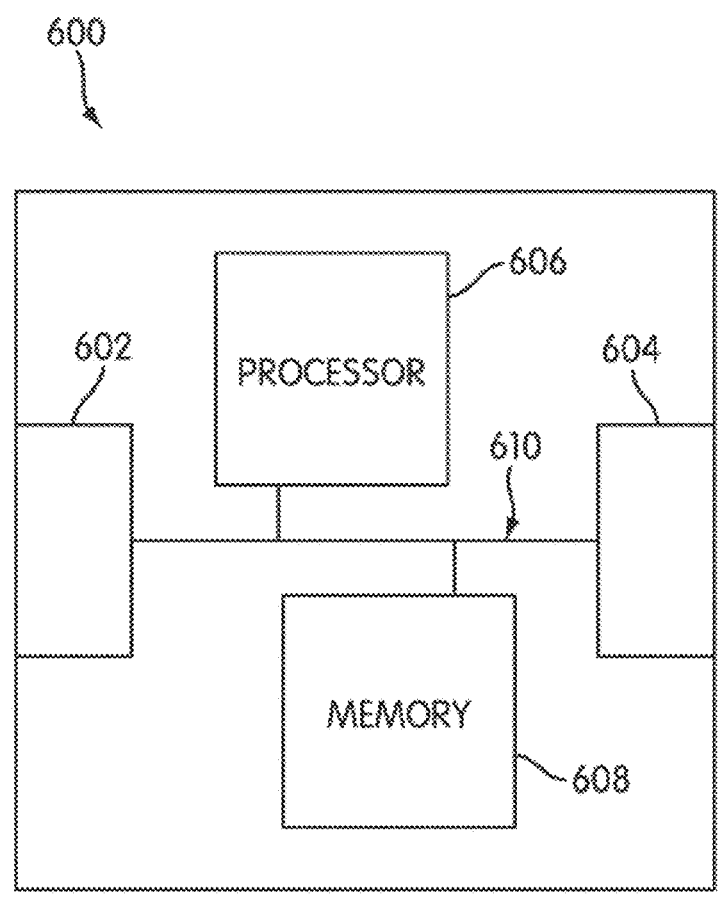
FIG. 6 depicts an exemplary computing system, suitable for performing aspects of the present invention.

Aspects of the invention, including computing device 212 and managing device 503 may be implemented with a variety of conventional networked computer devices such as the network device 600 shown in FIG. 6. Device 600 includes at least network interface ports 602 and 604 for receiving and sending data traffic, a central processor 606, a system memory 608, and a system bus 610 that couples various system components including ports 602 and 604, central processor 606 and system memory 608. System bus 610 may be any of several types of bus structures including a memory bus or memory controller, a peripheral bus, and a local bus using any of a variety of bus architectures. The structure of system memory 608 is well known to those skilled in the art and may include a basic input/output system (BIOS) stored in a read only memory (ROM) and one or more program modules such as operating systems, application programs and program data stored in random access memory (RAM). Interfaces 602 and 604 may be any type of network interface well known to those skilled in the art. Furthermore, device 600 may include drives for interfacing with other types of computer readable media.

A process of administering and maintaining a networked vending machine, such as vendor 100, according to aspects of the invention, may be implemented as follows. A venue may receive a vending machine 100 from a local merchandiser or bottler. The venue, such as a workplace, a school or a store, may receive, along with vendor 100, associated software for use by a managing device 503. A vendor manager, such as an office manager, may use the associated software for managing one or more consumer accounts, for managing inventory for the vendor 100, and for placing orders via a network 505 to a local bottler or distributer 506.

The software for use by managing device 503 may be written to any suitable form of computer readable medium such as to system memory (RAM) 608, to an external memory drive, floppy disk, CD, thumb drive, etc. A vendor manager may use such associated software for the establishment of consumer accounts and for management of the accounts, so that consumers may purchase vending products 110 from the vending machine 100. According to some embodiments, the consumer may have access to the management software to add value to an associated account. In alternative embodiments, a vendor manager may take full ownership of the accounts and simply deduct a balance due from a consumer's paycheck or school account.

Figure 7:
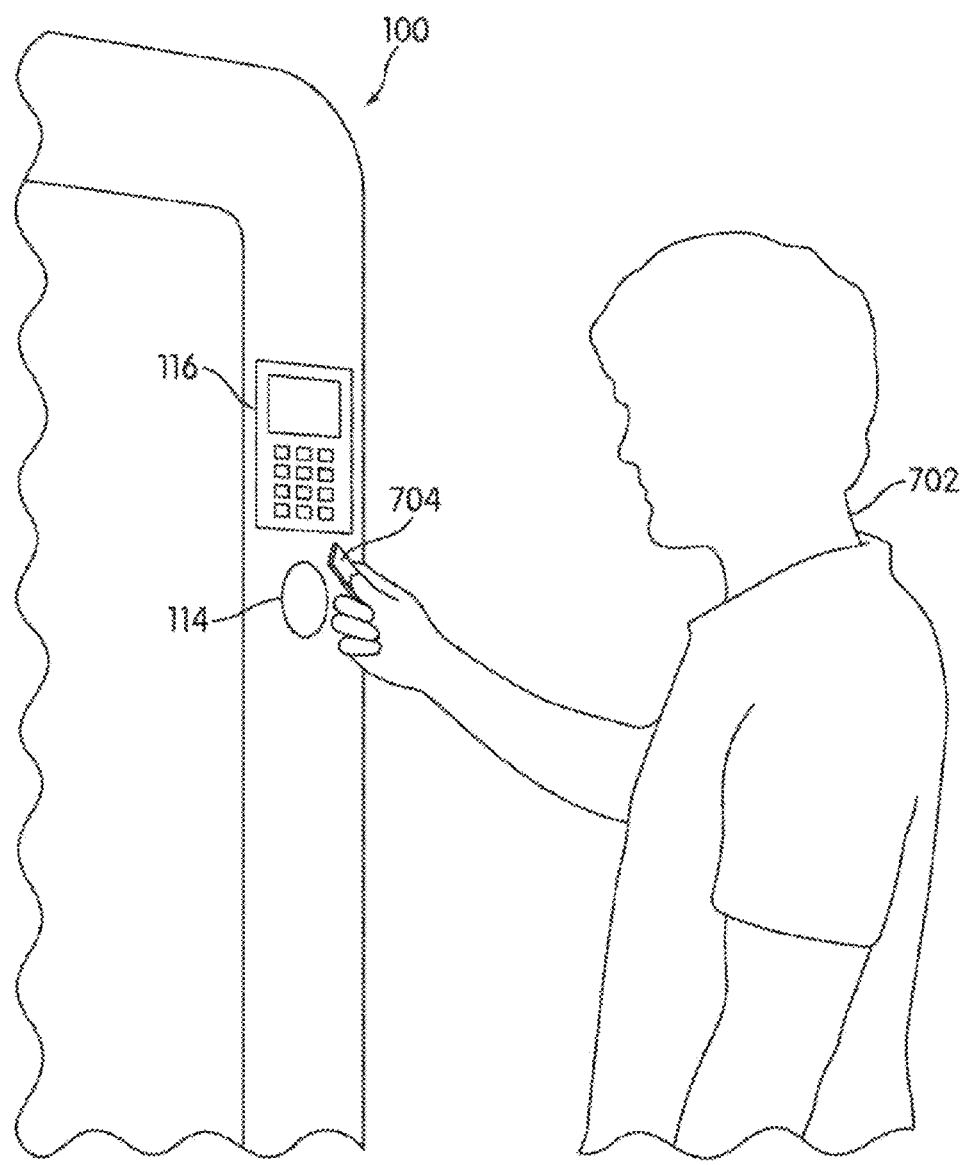
FIG. 7 depicts use of an exemplary ID card and exemplary sensor for vendor access, according to an embodiment of the invention.

FIG. 7 depicts use of an exemplary ID card 704 and exemplary sensor 114 for reading ID card 704. According to techniques described herein, a consumer 702 may access vendor 100 using an ID card 704 that is associated with an account for consumer 702. The ID card 704 may comprise a well-known RFID tag, or other known technique for transferring electronic information by use of a sensor detecting the electronic information when in close proximity. Alternative embodiments may include a keypad on the vendor, coupled to a computing device 212 within the vendor, wherein a consumer 702 may enter account information directly into a keypad.

Figure 8:
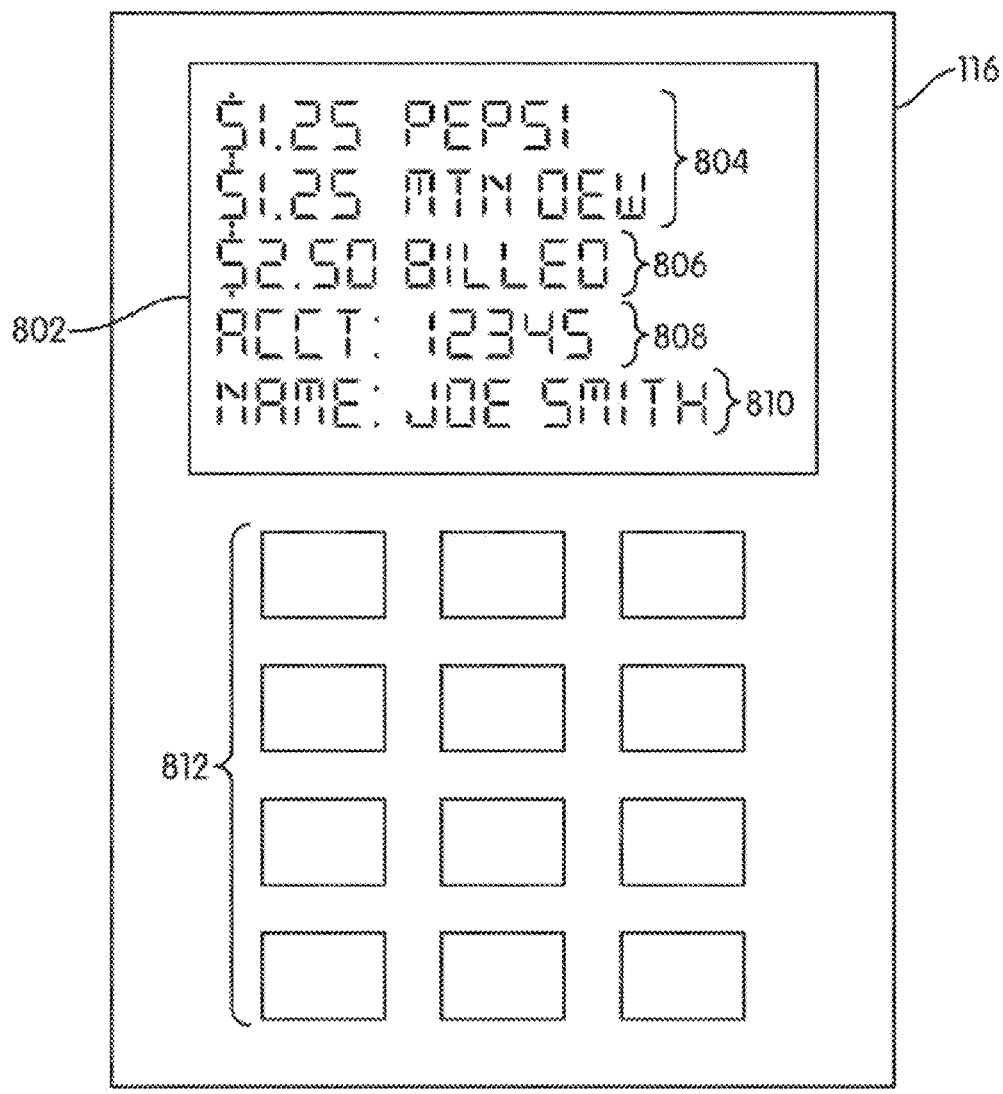
FIG. 8 depicts an exemplary vendor output screen after a consumer purchase, with keypad, according to an embodiment of the invention.

FIG. 8 depicts an exemplary display 116 for vendor 100, including output screen 802 and keypad 812. As depicted in FIG. 8, the output screen 802 may display information about a consumer purchase such as the cost and types of vending products that are purchased 804 ("$1.25 Pepsi" and "$1.25 Mountain Dew") an amount billed to the account 806 ("$2.50 Billed"), an account number 808 ("12345"), and a consumer name associated with the account 810 ("Joe Smith"). It is contemplated that the display items may include all of the items exemplified in FIG. 8 or only some of the items. In addition, display screen 802 may be used for display of other information, such as messages noting that vendor 100 is "Out of Order" or "Sold Out." Keypad 812 may be used as an alternative consumer input device. For instance, a consumer may key in an account number on keypad 812 to gain access to vendor 100 and purchase vending product(s) 110. As depicted in FIG. 2, display 116 is connected to computing device 212.

According to aspects of the invention, a consumer may purchase one or more vending products 110 from vendor 100 by unlocking the door with a detected and valid ID card 704, or with a valid account code entered into a keypad 812 on display 116. After consumer input device 114 or reads ID card 704, keypad 812 registers consumer account information keyed in, and communicates the associated account information to the vending computer device 212, or an external managing device 503, the consumer 702 may remove a desired vending product 110 from vendor 100. After removal of a purchased vending product 110, weight sensors 208 may determine and send weight data to the computing device 212 and/or managing device 503, to determine the vending product(s) removed by the consumer 702. Such determination may be made by computing device 212 by updating one or more inventory reports on computing device 212. For example, a specific insert 112 may have weight "X" before a consumer purchase, and weight "X minus Y" after a consumer purchase. With data comprising the exact change in weight taken from before the consumer purchase and after the consumer purchase, the computing device may determine the exact vending product 110 removed by consumer 702, based on inventory information recorded by computing device 212 from identification data 402 previously recorded.

It is contemplated that computing device 212 of vendor 100 may communicate such purchase data to the manager device 503 at a regularly scheduled time such that a vendor manager may deduct an appropriate amount for the purchased vending product 110 from a consumer's account. The communication of such data also allows the vendor manager to keep track of the vending product inventory in vendor 100 and make request for additional products.

According to aspects described herein, the venue may restock vending machine 100 by communicating with local bottler, distributer or manufacturer (506), or other entity that supplied the vendor 100. According to embodiments described herein, a vendor manager may choose a product mix for vendor 100 by selecting the insert(s) 112, filled with a particular vending product 110. The vendor manager may order additional inserts 112 from local bottler or distributor 506 via network 505. It is also contemplated that the vendor manager may order inserts 112 via facsimile order, telephone, or any other suitable means. The vendor manager, when ordering, may select a product mix using the specific identification data 402 contained on the insert 112, which may identify the vending product mix in a particular insert 112. The venue may receive the ordered vending product 110 pre-packed in the insert(s) 112 for insertion directly into vendor 100. Once inserted, vendor 100 may register the one or more new insert(s) 112 by using sensors 210 to read identification data 402 on insert(s) 112 and communicate such data to computing device 212.

While the invention has been described with respect to specific examples and to presently preferred modes of carrying out the invention, those skilled in the art will appreciate that there are numerous variations of the above described systems and methods that may fall within the spirit and scope of the invention. For example, those skilled in the art will recognize that the foregoing techniques may be implemented on a variety of bus-based networking systems and with a variety of transmission media. Networks based on wire, fiber optic cable, wireless or other transmission media may utilize the present invention. It should be further noted that certain aspects of the present invention have been described herein, but the invention is not limited to the embodiments described. The following claims demonstrate the breadth of the invention.

What is claimed is:

1. A system for managing a networked vending machine, the system comprising:
   a vending machine comprising:
      at least one rack in an interior area, the at least one rack configured to hold at least one insert, the insert comprising a plurality of soft drink products arranged in a linear direction from a front end of the insert to a rear end of the insert,
      a door configured to give a consumer access to the soft drink products,
      at least one insert sensor configured to read identification data on the at least one insert, the identification data comprising information related to at least one of: a characteristic of the soft drink products held within the insert and the insert itself,
      at least one weight sensor configured to determine weight data for the at least one insert, and
      a processor coupled to the at least one insert sensor, the at least one weight sensor, the consumer input device, and a network, and configured to receive and transmit data over the network; and
   a controller comprising computer-executable instructions configured to:
      manage inventory for the vending machine based on at least one of the weight data and the identification data, and
      receive a user's order for additional inserts containing a plurality of soft drink products.

2. The system of claim 1, wherein the identification data is contained on a conductive ink label adhered to the insert, and wherein the at least one insert sensor is configured to read the identification data on the conductive ink label.

3. The system of claim 1, wherein the identification data comprises information about the plurality of soft drink products in the insert.

4. The system of claim 3, wherein the information about the plurality of soft drink products in the insert comprises a type of product and a number of the product.

5. The system of claim 1, wherein the weight data comprises of a first weight of the insert determined before a soft drink product is removed, and a second weight of the insert determined after the soft drink product is removed.

6. The system of claim 1, further comprising a consumer input device configured to receive consumer information data.

7. The system of claim 6, wherein the consumer information data comprises a consumer account status and a consumer account balance.

8. The system of claim 6, wherein the consumer information data comprises a consumer account status and a consumer account balance and wherein the controller is configured to manage the account status and account balance.

9. The system of claim 6, wherein the consumer input device is a sensor, and wherein the sensor is configured to receive the consumer information data from a consumer RFID tag.

10. The system of claim 6, wherein the processor is configured to give a consumer access to the soft drink products based on the consumer information data.

11. The system of claim 10, wherein the processor is configured to give the consumer access to the soft drink products by unlocking the door.

12. The system of claim 1, wherein the controller is configured to send the user's order to a local distributor of the inserts.

13. The system of claim 1, wherein the processor is configured to register a new insert inserted into the vending machine based on identification data on the new insert read by the least one insert sensor.

14. The system of claim 1, wherein the controller is remotely located from the vending machine.

15. The system of claim 1, wherein the vending machine further comprises a display screen for displaying any of the following: a consumer account status, a consumer account balance, or a description of a vended soft drink product.

16. The system of claim 1, wherein the at least one insert sensor is disposed within the interior area of the vending machine.

17. A method of managing a networked vending machine, the vending machine comprising at least one insert holding a plurality of soft drink products and a door configured to give a consumer access to the soft drink products, the method comprising:
   determining, by a weight sensor in communication with a processor, a first weight of the at least one insert before a soft drink product is removed;
   determining, by the weight sensor in communication with the processor, a second weight of the at least one insert after the soft drink product is removed;
   receiving, at the processor, the first weight and the second weight;
   reading identification data displayed on the at least one insert with an insert sensor coupled to the vending machine, the identification data comprising information related to at least one of: a characteristic of the soft drink products held within the insert and the insert itself;
   transmitting the first weight, the second weight, and the identification data to a controller configured to manage the inventory of the networked vending machine based on at least one of the first weight and the second weight, and the identification data; and
   ordering, via the controller, additional inserts containing a plurality of soft drink products.

18. The method of claim 17, further comprising:
   receiving, at a consumer input device, consumer information data; and
   transmitting, over the network, the consumer information data.

19. The method of claim 18, wherein the consumer input device is a sensor configured to read an RFID tag, and wherein the consumer information data comprises at least one of the following: a consumer account status or a consumer account balance.

20. The method of claim 17, wherein an order for additional inserts is sent to a local distributor of the inserts.

21. The method of claim 17, further comprising registering a new insert inserted into the vending machine by reading identification data on the new insert.

22. A system for managing a networked vending machine, the system comprising:
   a vending machine comprising:
      at least one rack in an interior area, the at least one rack configured to hold at least one insert for holding a plurality of vending products, the vending products comprising one or more food or beverage products, wherein the insert comprises an open top, an open front end, a rear end, and a shape configured to hold the plurality of vending products in a linear arrangement from the open front end to the rear end of the insert, wherein the open front end comprises a shape that allows vending products to be accessed by a consumer, a door configured to give a consumer access to the vending products, at least one insert sensor configured to read identification data on the at least one insert, the identification data comprising information related to at least one of: a characteristic of a product held within the insert and the insert itself, at least one weight sensor configured to determine weight data for the at least one insert, and a processor coupled to the at least one insert sensor, the at least one weight sensor, the consumer input device, and a network, and configured to receive and transmit data over the network; and a controller comprising computer-executable instructions configured to:

manage inventory for the vending machine based on at least one of the weight data and the identification data, and receive a user's order for additional inserts containing a plurality of vending products.

\* \* \* \* \*